UNITED STATES PATENT OFFICE.

MORIZ NOWAK, OF WILLIAMSBURG, NEW YORK.

IMPROVED BLASTING COMPOUND.

Specification forming part of Letters Patent No. 42,869, dated May 24, 1864.

*To all whom it may concern:*

Be it known that I, MORIZ NOWAK, of Williamsburg, in the county of Kings and State of New York, have invented a new and Improved Blasting Compound, which I term "Water-Tight Blasting-Pasta"; and I do hereby declare that the following is a full, clear, and exact description of the same, enabling those skilled in the art to fully understand, make, and use it.

This invention consists in the application to vegetable materials of any description—such as leaves from trees, sawdust, or waste cotton—of a composition of binoxide of manganese or carbon chlorate of potash, nitrate of potash, and ferrocyanide of potash mixed with a small quantity of starch and of chromate of potash in such a manner that after said vegetable materials are fully impregnated with the above-named compositions they can be formed into suitable packages or cartridges protected by water-tight paint and used for blasting purposes below or above the surface of the water.

For the purpose of manufacturing my water-tight blasting-pasta I can use all vegetable materials; but I have found it most convenient to employ ordinary blotting-paper. This material is saturated with a solution of the above-named materials mixed together in about the following proportions: binoxide of manganese, ($MnO_2$,) twenty-three grams, or, instead thereof, carbon, ($C$,) fifteen grams; chlorate of potash, ($CeO_5KO$,) sixty-two grams; nitrate of potash, ($NO_5KO$,) thirty-one grams; ferrocyanide of potash, ($_2KIyFely\&_3HO$,) fifteen grams. These ingredients are dissolved in about four quarts of pure water and boiled for about half an hour, until all the ingredients are perfectly dissolved, and then I add half a teaspoonful of starch ($C_{12}H_{10}O_{10}$) dissolved in a small quantity of water for the purpose of binding together the other ingredients, and the boiling of the mass is discontinued. If desired, a small quantity of sugar may be added. Finally, I dissolve fifteen grams of bichromate of potash ($_2CrO_3KO$) in a small quantity of water, and of this solution I add from one to two tea-spoonfuls to the boiling mass. Thus prepared the solution is ready, and the linen fabric, cotton, waste paper, or other vegetable material is saturated with it and then carefully dried. If paper is used, the saturated paper when dry is rolled up in the shape of cigars to the desired thickness—for instance, three-fourths to one inch thick and four to six inches long—and then surrounded by a strip of common paper, which is fastened with gum; but in case sawdust, cotton waste, or other similar material has been saturated with the solution said material is filled into paper cylinders previously prepared for that purpose and ignited by means of a fuse or by metal wire and electricity. In order to render these cartridges water-tight, I cover them with a varnish prepared as follows: tar, four parts; resin, one part; burned but unslaked lime, one part. These ingredients are carefully worked together in a water bath and the mixture applied to the cartridges; and if asphaltum can be had it may also be used with advantage in the above mixture. The coat of varnish is finally covered with the residuum of ordinary varnishes, which renders the cartridges perfectly water-tight.

The power of my blasting-pasta is much greater than that of ordinary blasting-powder. It can be used with advantage for the purpose of blasting rocks under water or in wet mines. It is not liable to explode spontaneously. It can be manufactured without danger, and it can be transported with perfect safety.

What I claim as my invention, and desire to secure by Letters Patent, is—

The within-described composition of the ingredients above specified, when mixed together in about the proportion set forth and applied to paper, textile fabrics, cotton waste, sawdust, or other vegetable materials, substantially in the manner and for the purpose described.

M. NOWAK.

Witnesses:
   HENRY MORRIS,
   J. W. COOMBS.